United States Patent [19]

Fraser

[11] Patent Number: 4,821,258
[45] Date of Patent: Apr. 11, 1989

[54] CROSSPOINT CIRCUITRY FOR DATA PACKET SPACE DIVISION SWITCHES

[75] Inventor: Alexander G. Fraser, Bernardsville, N.J.

[73] Assignee: American Telephone and Telegraph Company AT&T Bell Laboratories, Murray Hill, N.J.

[21] Appl. No.: 893,602

[22] Filed: Aug. 6, 1986

[51] Int. Cl.⁴ .............................................. H04J 3/02
[52] U.S. Cl. .................................. 370/60; 340/825.89
[58] Field of Search ............................ 370/60, 63, 94; 340/825.79, 825.89, 825.03, 825.51, 825.87

[56] References Cited

U.S. PATENT DOCUMENTS

| Re. 31,319 | 7/1983 | Fraser | 370/80 |
|---|---|---|---|
| 3,810,160 | 5/1974 | Hedde | 340/825.87 |
| 4,603,416 | 7/1986 | Servel et al. | 370/60 |
| 4,638,475 | 1/1987 | Koike | 370/60 |
| 4,679,190 | 7/1987 | Dias et al. | 370/60 |
| 4,683,564 | 7/1987 | Young et al. | 370/63 |
| 4,701,755 | 10/1987 | Nakagawa et al. | 370/85 |

Primary Examiner—Douglas W. Olms
Assistant Examiner—Min Jung
Attorney, Agent, or Firm—Henry T. Brendzel

[57] ABSTRACT

An electronics space-division packet switch is disclosed in which each switch crosspoint includes digital logic capable of resolving simultaneous contentions for the source output buss medium. In particular, a bit-by-bit comparison of priority codes disconnects all switches but the one with the highest priority from the output buss.

This extremely simple crosspoint switch structure makes possible extremely large space-division packet switches in very compact physical form, using large scale integration techniques.

12 Claims, 2 Drawing Sheets

CROSSPOINT CIRCUITRY FOR DATA PACKET SPACE DIVISION SWITCHES

BACKGROUND OF THE INVENTION

1. Field of the Invention

This invention relates to data packet switching systems and, more particularly, to combined time-division and space-division switching systems for data packets.

2. Description of the Prior Art

Packet transmission of data is an efficient method of time-sharing the capacity of a transmission line among several streams of data. A packet is formed by combining data characters from a single data communication conversation with a header containing address information. When data transmission is bursty, the packets of one conversation may efficiently share a single transmission facility with those of other conversations. The packets of the several conversations are interleaved in time, taking advantage of the idle times between bursts of transmission in each of the several conversations. The data packets belonging to several conversations are transmitted independently of each other, each routed by the address information in its packet header.

Data packets must be switched at transmission branching points. As each packet enters a switch, it is routed to an outgoing transmission line selected on the basis of the address information in the packet header. Time-division packet switches have traditionally accomplished this by merging onto a single buss the packets from all incoming transmission lines. From that single buss, the packets are then redistributed to the several outgoing transmission lines. It can thus be seen that a time-division packet switch is a switch in which many users utilize the same physical facility (the buss) at different times.

Modern data transmission requirements suggest the need for large switches capable of handling traffic from a very large number of transmission lines. In this case, the limited capacity of a single time-division buss becomes a constraint on the capabilities of the switch. An alternative design for a packet switch is therefore required which has no such constraint.

SUMMARY OF THE INVENTION

In accordance with the illustrative embodiment of the present invention, packet data transmission systems are constructed from multiple time-division packet switches interconnected by a space-division packet switch. A space-division packet switch is a switch in which different users utilize different physical facilities at the same time. In the present invention, the space-division switch is a matrix of cross-point switches that connect each of a plurality of input busses to one of a plurality of output busses.

In order to accommodate the packet-sized messages, each cross-point switch is constructed to switch one entire packet from an input buss to one of a plurality of output busses in response to address information in the packet header. Thus, unlike cross-point switches in a circuit-switched system, the cross-points of the present invention provide a connection only temporarily for the duration of the packet, and not for the duration of an entire bilateral communication interval between the sender and the receiver.

In further accord with the present invention, if two or more data packets destined for the same output buss arrive simultaneously on a plurality of input busses, a priority contention scheme ensures that one, and only one, data packet (as determined by its priority code) is allowed access to the output buss at any one time. In a preferred embodiment, this contention is carried out by placing the priority code, one bit at a time, on a contention buss. Sources with lower-valued priority codes are dropped until only one contender remains to be gated to the output buss.

By using integrated circuit technology to implement the crosspoint switches, many such switches can be fabricated on a single chip, thus providing a cross-point switching network of extremely small size. One major advantage of the present invention resides in the fact that the cross-point switch does not have to operate at a rate any faster than the data speed of the incoming data packets. Moreover, the switch control circuitry is not centralized, but is distributed throughout the cross-points themselves. A control circuit failure therefore disables only a single cross-point, and not the entire switch.

DETAILED DESCRIPTION

Figure 1:
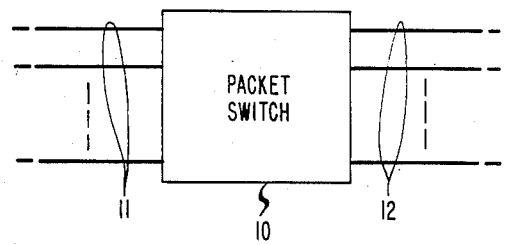
FIG. 1 is a block diagram of a packet switch in which the present invention might find use.

Referring more particularly to FIG. 1, there is shown a packet switch 10 having a first plurality of input data lines 11 and a second plurality of output data lines 12. Message packets, to be described in connection with FIG. 2, arrive asynchronously on input data lines 11. In response to destination information contained in the message packets themselves, each packet is switched from one of input data busses 11 to the appropriate one of output data busses 12. A plurality of data packets can therefore be switched simultaneously, as long as no conflict arises in the use of output busses.

Figure 2:
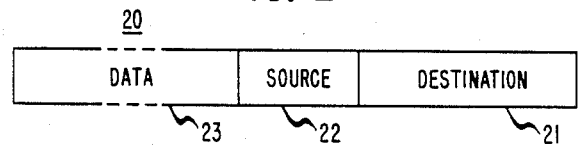
FIG. 2 is a graphical representation of a data packet of the type to be switched by the switch of FIG. 1.

Referring to FIG. 2, there is shown a graphical representation of a single data packet 20 comprising a header including a destination address 21 and a source address 22. Following the header is a block of data 23. The packet of FIG. 2 can be of a fixed length or of variable length, depending on the system in which it is used. From the point of view of the switch 10 of FIG. 1, packets can be of any length whatsoever. For simplicity, however, it will be assumed that the packets are of a preselected fixed size. The modifications necessary to accommodate variable length packets will be obvious to those of ordinary skill in the art.

Figure 3:
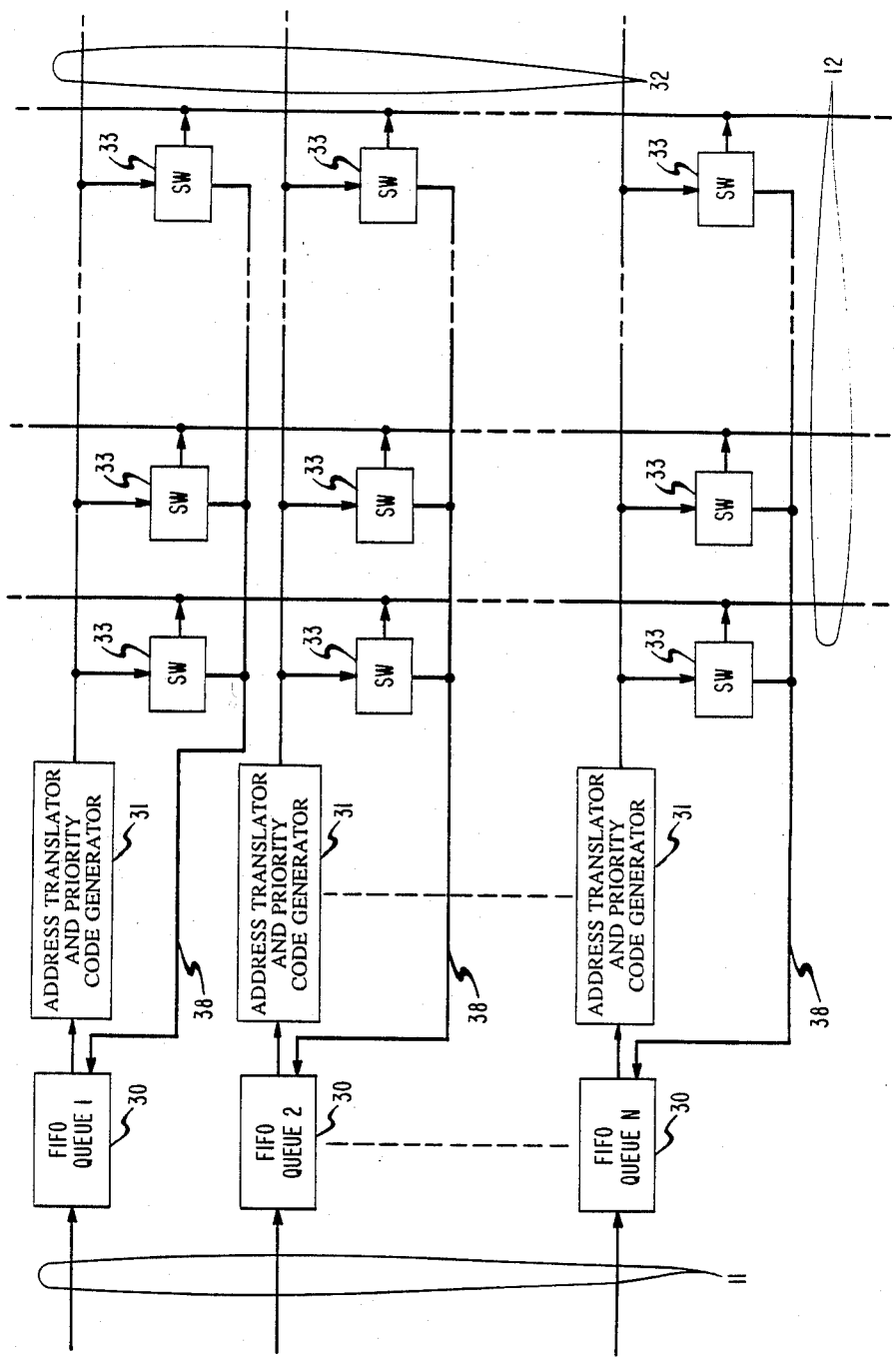
FIG. 3 is a general block diagram of the internal construction of a space-division switch suitable for use in the packet switch of FIG. 1.

In accordance with the present invention, FIG. 3 discloses a detailed block diagram of the space-division packet switch useful as the packet switch 10 of FIG. 1. The packet switch of FIG. 3 comprises a plurality of input busses 11, each of which is connected to a "first-in, first-out" (FIFO) queue register 30. Each of FIFO queue registers 30 is connected to an address translator 31, which translates the header information into a column address, which identifies a unique one of output (column) lines 12, and a priority code, which determines which input packet will take precedence in the case of a conflict. A conflict arises when two or more data packets on different input busses 11 simultaneously contend for the same one of output busses 12.

Bridged between each of row input busses 32 and each of column output busses 12 is a crosspoint switch 33. Each of cross-point switches 33, to be described in detail in connection with FIG. 4, serves to connect one of row busses 32 to one of column busses 12 for the duration of a single data packet, such as that illustrated in FIG. 2.

FIFO registers 30 are of well-known design and of sufficient capacity adequately to buffer incoming packet traffic on input busses 11. Such FIFO registers are well-known in the art and will not be further described here. The size of registers 30 is a function of the expected traffic load, all in accordance with well-known switching technology. In general, registers 30 served as a mechanism for temporarily storing data packets received on row input busses 11 while they await the availability of the desired one of column output busses 12.

Address translators 31 translate the destination, source, or combined destination and source addresses, into a column identifier code and a priority code. The column identifier code identifies one, and only one, of column output busses 12. The priority code determines which of two or more data packets competing simultaneously for the same column output buss 12 is served first. The column identification code and the priority code are both prefixed to the data packet so as to arrive at the balance of the circuitry of FIG. 3 ahead of the remainder of the packet. Translators 31 can be simple logic circuits to make the desired code changes, where higher priority code values imply higher levels of priority. Address translators 31 could also comprise a read only memory (ROM) addressed by the source/destination address information in the packet header. The read-only-memory then would store and read out appropriate column identity and priority codes at that address. Since such code translators are likewise well-known in the art, they will not be further described here.

Busy wires 38 are connected to crosspoints 33 to signal the message source that the crosspoint is in the process of transmitting a packet to the connected column output buss. The FIFO queue register 30 uses this busy signal to pause in transmitting packets until the busy signal is removed, indicating that the crosspoints are again available for use.

Figure 4:
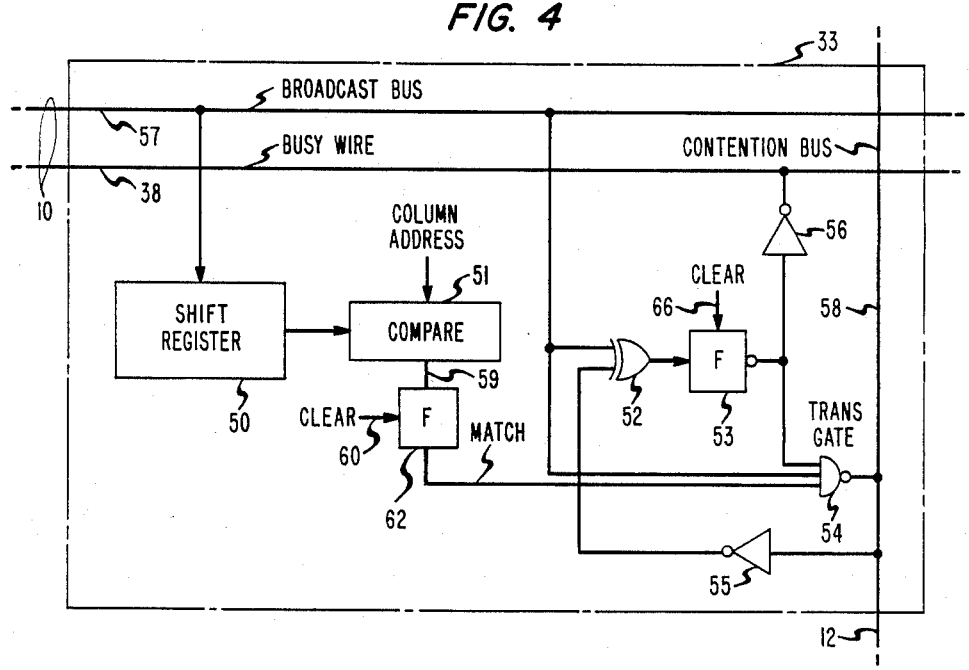
FIG. 4 is a detailed circuit diagram of one cross-point of the space division switch of FIG. 3.

In FIG. 4 there is shown a detailed circuit diagram of one of the cross-point circuits 33 of FIG. 3. In FIG. 4, the cross-point circuit 33 can be seen to comprise a shift register 50, a compare circuit 51, an EXCLUSIVE-OR gate 52, latch circuits 53 and 62, a transmission gate 54, and two inverters, inverters 55 and 56. At the beginning of each packet timeframe, the packet to be switched is broadcast on the broadcast buss portion 57 of one of input busses 11. The column address code from broadcast buss 57 is copied into shift register 50 of each of the cross-points 33 connected to broadcast buss 57. Once the complete column address for the packet is available in shift register 50, this column address is applied to compare circuit 51. Simultaneously, the column address code associated with the particular contention bus 58 of output busses 12 associated with each crosspoint circuit is also applied to compare circuit 51. An address match will occur in only one of the cross-points 33. The result of a successful comparison is transmitted over lead 59 to latch 62 where it is stored for the duration of the current packet. Latch circuit 62, in turn, partially enables transmission gate 54.

A priority code, transmitted least significant bit first, follows the column identification code on broadcast buss 57. This priority code, and the data which immediately follows, are simultaneously applied to transmission gate 54 and EXCLUSIVE-OR gate 52. The third and final enabling lead to transmission gate 54 is taken from the inverted output of latch circuit 53.

Latch circuit 53 stores the result of priority contentions using the priority codes generated in translator circuits 31 of FIG. 3. At the beginning of each packet period, latch circuit 53 (along with latch circuit 62) is cleared by a signal on lead 60. Transmission gate 54 is therefore partially enabled at the beginning of the packet period. At this time, the priority codes, generated in address translators 31 and prefixed to the data packets, are simultaneously launched through their respective transmission gates 54 onto the common contention buss 58. As each bit of the priority codes are routed onto contention buss 58, they are combined with the bits of corresponding significance from priority codes from other cross-points on buss 58. Transmission gates 54 may be designed, for example, as open-collector drivers to permit such operation.

The result of this arrangement is that the value on contention buss 58 during any priority bit period is the logical sum of all of the priority code bits of that significance simultaneously being applied to buss 58. Inverter 55 receives this logical sum, inverts it, and applies it to EXCLUSIVE-OR gate 52. At the same time, the corresponding bit of the priority code on broadcast buss 57 is applied to the other input of EXCLUSIVE-OR gate 52. Thus, EXCLUSIVE-OR gate 52 compares the priority code on broadcast buss 57 with the combined priority bits on contention buss 58, one bit at a time. If a discrepancy occurs between the two inputs to EXCLUSIVE-OR gate 52, an output is produced to set latching circuit 53 and disable transmission gate 54.

It will be noted that, at the end of the priority code, only that crosspoint having the highest priority code will have its latching circuit 53 clear; all the rest will have been set by EXCLUSIVE-OR gate 52. That is, only the crosspoint corresponding to the highest valued priority code will continue to be connected to contention buss 58. All of the other crosspoints will have been previously disconnected by the setting of latching circuit 53 in response to a priority code bit which is a zero when the corresponding bit of a higher priority code will have produced a one on broadcast buss 57.

When latching circuit 53 is cleared, an output from inverter 56 is applied to busy wire 38 to provide an indication that a packet is in the process of being switched from buss 57 to buss 58. This busy signal blocks transmission of the packet from FIFO queue register 30 (FIG. 3) until the next packet time-slot. At the end of the packet, latching circuit 53 is again cleared by a signal on lead 60, the busy signal is removed from lead 38 and the entire process can be repeated.

If no other data packets on other broadcast busses are contending with the data packet at the crosspoint of FIG. 4, the only priority bits appearing in contention buss 58 will be those supplied by crosspoint 33 of FIG. 4. At the end of the priority code, transmission gate 54 will continue to be operated due to the match in every bit position, as detected by gate 52. The data following the priority code on broadcast buss 57 is transferred from buss 57 to buss 58 through transmission gate 54.

It will be noted that the space-division crosspoint circuits of the present invention are simple digital logic and digital storage circuits well-suited for large scale integration. It is therefore possible to realize a very large electronic crosspoint switch in accordance with the present invention as a very small and compact device.

It will be further noted that the speed requirements of the digital circuits of the present invention are no faster than the bit rate of the data packets themselves. This remains true regardless of the size (number of crosspoints) of the electronic crosspoint switch. This is a distinct advantage over time-division switches, particularly, for larger switch sizes.

What is claimed is:

1. A digital crosspoint switch for data packets including address headers, said switch comprising:
    an array of input busses and output busses,
    priority code generating means, and
    a crosspoint circuit at each crosspoint between each of said input bus and each of said output buses,
    each of said crosspoint circuits including
    output address detecting means, and
    means responsive to only one output address, and controlled by a priority code, for connecting each one of said input busses to only the addressed one of said output busses for the duration of one of said data packets.

2. The digital crosspoint switch according to claim 1 wherein said priority code generating means is responsive to a destination code in each said data packet.

3. The digital crosspoint switch according to claim 1 wherein said priority code generating means is responsive to a source code in each said data packet.

4. A space division packet switch comprising:
    a first plurality of input data packet busses,
    a second plurality of output data packet busses,
    crosspoint circuit means connected between each of said input busses and each of said output busses, and
    means in each of said crosspoint circuit means, responsive only to data in a data packet, for resolving conflicts between a plurality of data packets requiring the same output buss at the same time, to connect only a single input buss to a single output buss for the duration of a single data packet.

5. The packet switch according to claim 4 wherein said packet switch further comprises
    buffer storage means for storing data packet signals.

6. The packet switch according to claim 4 wherein said crosspoint further comprises contention solution circuitry responsive to priority codes included in each of said data packets.

7. The packet switch according to claim 6 wherein said contention resolution circuitry includes
    means for comparing each binary digit of a plurality of simultaneously available priority codes, one digit at a time, and disconnecting all of said input busses with a data packet including a priority code lesser in value than the priority code of any other data packet which is simultaneously available.

8. The packet switch according to claim 7 wherein said means for comparing includes
    means for connecting contending packets to an output bus and transmitting each digit of priority codes of said cotending packets on
    said output bus to form combined digits,
    comparing each combined digit of said combined digits on the output bus with each digit of the priority code of each cotending packet forming said each combined digit, and
    means for disconnecting all cotending packets from said output bus having a priority digit value different from said combined digit that is formed with said priority digit value.

9. The method of switching digital data packets between a plurality of input busses and a plurality of output busses, said method comprising the steps of
    detecting the address of a unique one of said output busses in the header of a data packet on any one of said input busses,
    detecting a priority code in the header of each data packet on input busses simultaneously contending for the same output buss,
    connecting only that one of a plurality of simultaneously contending packets on different input busses having the highest valued priority code, to the output buss addressed by said address.

10. The method of switching digital data packets according to claim 9 further comprising the step of
    generating said priority codes in response to information in the headers of said data packets.

11. A space division packet switch comprising:
    a first plurality of input lines for supplying data packets,
    a second plurality of output lines for delivering said data packets,
    a plurality of means each responsive to one of said input lines for connecting one, and only one, input line to each output line for the duration of one of said data packets, and
    means associated with each of said input lines for buffering data packets which are not transmitted to an output line and for delivering buffered data packets at a later time.

12. The space division packet switch according to claim 11 further comprising
    means responsive to a priority code associated with each of said data packets for resolving simultaneous requests for connection to the same output line in favor of the data packet associated with the highest priority code.

* * * * *